(12) United States Patent
Yatsuda et al.

(10) Patent No.: US 7,295,743 B2
(45) Date of Patent: Nov. 13, 2007

(54) OPTICAL WAVEGUIDE, OPTICAL WAVEGUIDE FERRULE, AND OPTICAL CONNECTOR

(75) Inventors: Kazutoshi Yatsuda, Ashigarakami-gun (JP); Keishi Shimizu, Ashigarakami-gun (JP); Shigemi Ohtsu, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/059,337

(22) Filed: Feb. 17, 2005

(65) Prior Publication Data

US 2006/0024012 A1 Feb. 2, 2006

(30) Foreign Application Priority Data

Jul. 28, 2004 (JP) ............................. 2004-220117

(51) Int. Cl.
*G02B 6/10* (2006.01)
(52) U.S. Cl. ............................ 385/129; 385/59; 385/60
(58) Field of Classification Search .................... None
See application file for complete search history.

(56) References Cited

U.S. PATENT DOCUMENTS

| 5,214,730 | A | * | 5/1993 | Nagasawa et al. ............ 385/59 |
| 5,222,168 | A | * | 6/1993 | Saito et al. .................... 385/59 |
| 5,600,747 | A | * | 2/1997 | Yamakawa et al. ........... 385/59 |
| 6,259,856 | B1 | * | 7/2001 | Shahid ......................... 385/147 |
| 6,498,880 | B1 | * | 12/2002 | Moore .......................... 385/78 |
| 6,767,141 | B1 | * | 7/2004 | Dudek et al. ................. 385/92 |
| 6,909,827 | B2 | * | 6/2005 | Schmitt et al. ................ 385/52 |
| 2001/0009597 | A1 | * | 7/2001 | Alibert ......................... 385/52 |
| 2001/0041034 | A1 | * | 11/2001 | Sasaki et al. ................. 385/88 |
| 2004/0114866 | A1 | * | 6/2004 | Hiramatsu .................... 385/39 |

FOREIGN PATENT DOCUMENTS

| JP | 08-248269 | 9/1996 |
| JP | 09-105838 | 4/1997 |
| JP | 2001-324631 | 11/2001 |
| JP | A 2002-40298 | 2/2002 |

* cited by examiner

*Primary Examiner*—Sung Pak
(74) *Attorney, Agent, or Firm*—Oliff & Berridge PLC

(57) ABSTRACT

The present invention provides an optical waveguide including an optical waveguide core for transmitting optical signals, a plate-shaped clad portion containing the optical waveguide core therein, and at least one of a concave portion and a convex portion at an end surface portion of the clad portion which end surface portion is disposed near one end of the optical waveguide core; an optical waveguide ferrule having an opening portion for receiving an optical waveguide, and at least one of a convex portion and a convex portion having a concave portion on an inner surface thereof at one end of the opening portion; and an optical connector in which the optical waveguide is inserted in the opening portion of the optical waveguide ferrule.

17 Claims, 8 Drawing Sheets

OPTICAL WAVEGUIDE, OPTICAL WAVEGUIDE FERRULE, AND OPTICAL CONNECTOR

CROSS-REFERENCE TO RELATED APPLICATION

This application claims priority under 35 U.S.C. 119 from Japanese Patent Application No. 2004-220117, the disclosure of which is incorporated by reference herein.

BACKGROUND OF THE INVENTION

1. Field of the Invention

This invention relates to an optical waveguide, and an optical waveguide ferrule to which the optical waveguide is fit, and to an optical connector including these components, which are used in the fields of optical communication and optical information processing.

2. Description of the Related Art

In recent years, with the spread and development of information transmitting means such as the Internet, there has been an increasing demand for large-volume and high-speed data transmissions. Optical fibers capable of transmitting a massive volume of information farther with less transmission loss have been used to transmit a large volume of data at high speed, and a multi-core optical connector has been used to collectively connect a plurality of such optical fibers.

This multi-core optical connector is connected to a multi-core optical fiber connector. Here, optical axes of optical waveguides of the multi-core optical connector need to be aligned respectively with optical axes of optical waveguides of the multi-core optical fiber connector. To achieve this, for example, a method called "active alignment" has been used, in which the multi-core optical connector is moved relative to the multi-core optical fiber connector, through optical waveguides of which light is made to pass, such that the intensity of the light entering the optical waveguides of the multi-core optical connector can be maximized, thereby causing the optical axes of the optical waveguides of the multi-core optical connector to align with the optical axes of the optical waveguides of the multi-core optical fiber connector.

However, this active alignment operation is conducted manually, and therefore the cost is high. To reduce the cost, it is required to simplify this operation or to produce a multi-core optical connector and a multi-core optical fiber connector which requires no special alignment operation.

Therefore, as shown in FIG. 8, a method employing an optical waveguide 108, a connector 112 and an optical fiber connector 120 has been disclosed (see, for example, Japanese Patent Application Laid-Open (JP-A) Nos. 8-248269 (Pages 3 to 4, and FIG. 1), 9-105838 (Page 4, and FIG. 1) and 2001-324631 (Page 4, and FIG. 3)). The optical waveguide 108 has a substrate 102, and also has, on the substrate 102, optical waveguide cores 104 and a clad portion 106 surrounding the optical waveguide cores 104. Positioning grooves 110 (or step portions) are formed respectively at opposite side portions of the optical waveguide 108, and extend parallel to each other in the longitudinal direction of the optical waveguide 108. On the other hand, the connector 112 to which optical waveguides cores 122 are to be connected has convex portions 114 corresponding respectively to the grooves 110 of the optical waveguide 108. The positioning grooves 110 of the optical waveguide 108 are engaged respectively with the convex portions 114 of the connector 112, thereby positioning the optical waveguide cores 104 relative to the connector 112.

Since the grooves 110 extend in the longitudinal direction of the optical waveguide cores 104 as described above, the optical waveguide cores 104 are securely positioned in a direction perpendicular to the longitudinal direction of the optical waveguide cores 104 (i.e., a direction parallel to the width of the optical waveguide). However, the optical waveguide cores 104 are not securely positioned in the longitudinal direction of the optical waveguide cores 104. Therefore, when the connector 112 to which the optical waveguide 108 is connected, is connected to the optical fiber connector 120, the optical waveguide 108 must be positioned relative to the optical fiber connector 120 by making the end surfaces of the optical waveguide cores 104 respectively abut the end surfaces of the optical waveguide cores 122 of the optical fiber connector 120. As a result, the end surfaces of the optical waveguide cores 104 are damaged, and optical connection loss increases.

To solve these problems, a method in which tapering surfaces are formed at an optical waveguide and a connector, and the optical waveguide and the connector are positioned relative to each other using these tapering surfaces has been disclosed (see, for example, JP-A No. 2002-020498 (Page 4, and FIG. 1)). This method described briefly, opposite side surfaces of the optical waveguide in a direction parallel to the width of the optical waveguide are used as positioning surfaces, and the tapering surface slanting relative to a plane parallel to optical waveguide cores is formed at one of the side surfaces. Another tapering surface is also formed at the surface of the connector facing the tapering surface of the optical waveguide. The optical waveguide is inserted into the fitting portion of the connector. When a distal end of the tapering surface of the optical waveguide reaches a distal end of the tapering surface of the connector, the optical waveguide is prevented from further advancing, thereby positioning the optical waveguide relative to the fitting portion of the connector.

In this method, however, in cases where the optical waveguide cores are formed on a silicon substrate, a glass substrate or the like, or the optical waveguide is composed of a polymer compound having an insufficient mechanical strength, the optical waveguide, when inserted into the fitting portion of the connector, may be deflected by reaction force developing during the positioning operation carried out by the use of the tapering surfaces, increasing optical connection loss.

Therefore, there is a need for an optical waveguide ferrule having a small size and a sufficient strength, an optical waveguide to be fit in this ferrule, and an optical connector including these components.

SUMMARY OF THE INVENTION

A first aspect of the invention provides an optical waveguide including an optical waveguide core for transmitting optical signals, a plate-shaped clad portion containing the optical waveguide core therein, and at least one of a concave portion and a convex portion at an end surface portion of the clad portion which end surface portion is disposed near one end of the optical waveguide core.

In this construction, the optical waveguide core is surrounded by the plate-shaped clad portion, and the clad portion has the concave or convex portion. When the optical waveguide is inserted into an optical waveguide ferrule having a convex portion or a convex portion having a concave portion, the concave or convex portion of the clad portion abuts the convex portion or the concave portion of the optical waveguide ferrule. Thereby, the optical waveguide core is positioned relative to the optical waveguide ferrule. Therefore, by merely connecting the resultant optical connector to an optical fiber connector, the end surface of the optical waveguide coincides with the end surface of the optical waveguide of the optical fiber connector. Accordingly, it is unnecessary to conduct a special aligning operation. Therefore, the above operation is not complicated, and operation cost can be reduced.

The concave or convex portion of the clad portion which, when the optical waveguide is connected to the optical waveguide ferrule, is engaged with the convex portion or the concave portion of the optical waveguide ferrule is formed at an end surface portion of the clad portion which is disposed near the one end of the optical waveguide core. Therefore, the optical waveguide does not need to have additional space where the concave or convex portion is formed, and therefore the width of the optical waveguide does not increase. Accordingly, even when the number of the optical waveguide core increases, the width of the optical waveguide corresponds to the width of a row of cores arranged in parallel. Moreover, the area of the opening portion of the optical waveguide ferrule can be smaller than in a case where the optical waveguide has a silicon substrate, a glass substrate or the like. As a result, the mechanical strength of the ferrule is not lowered, and the ferrule does not easily bend down, whereby increase in optical connection loss due to misalignment of the optical axes can be suppressed.

A second aspect of the invention provides an optical waveguide ferrule having an opening portion for receiving an optical waveguide, and at least one of a convex portion and a convex portion having a concave portion on an inner surface thereof at one end of the opening portion.

In this construction, the optical waveguide ferrule has the convex portion or the convex portion having the concave portion in the opening portion. Therefore, when an optical waveguide having a concave portion or a convex portion is inserted into the opening portion of the optical waveguide ferrule, the concave or convex portion of the optical waveguide is engaged with the convex portion or the concave portion of the optical waveguide ferrule, thereby easily positioning the optical waveguide relative to the optical waveguide ferrule.

A third aspect of the invention provides an optical connector having: an optical waveguide including an optical waveguide core for transmitting optical signals, a plate-shaped clad portion containing the optical waveguide core therein, and at least one of a concave portion and a convex portion at an end surface portion of the clad portion which end surface portion is disposed near one end of the optical waveguide core; and an optical waveguide ferrule having an opening portion for receiving the optical waveguide, and, when the optical waveguide has a concave portion, having a convex portion and, when the optical waveguide has a convex portion, having a convex portion having a concave portion, on an inner surface thereof at one end of the opening portion; wherein the optical waveguide is inserted in the opening portion of the optical waveguide ferrule, and the at least one of the concave portion and the convex portion of the optical waveguide is engaged with at least one of the convex portion and the concave portion of the convex portion of the optical waveguide ferrule.

In the invention, the optical waveguide has the concave or convex portion (preferably the concave portion) which is to be engaged with the convex portion or the concave portion (preferably the convex portion) of the optical waveguide ferrule to thereby position the optical waveguide relative to the optical waveguide ferrule. In this construction, no fixed portion for preventing the waveguide from starting in the ferule is provided between the waveguide and the ferrule. Therefore, even when an adhesive, with which a gap between the optical waveguide and the optical waveguide ferrule is filled to fix them to each other, shrinks upon curing, force occurring due to curing of the adhesive uniformly works on the optical waveguide and the optical waveguide ferrule. As a result, increase in optical connection loss due to misalignment of the optical axes can be suppressed.

The invention can provide, due to the above constructions, an optical waveguide ferrule which has a small size and sufficient strength, an optical waveguide which can fit in this ferrule, and an optical connector including these components.

BRIEF DESCRIPTION OF THE DRAWINGS

Preferred embodiments of the invention will be described in detail based on the following figures, wherein.

DETAILED DESCRIPTION OF THE INVENTION

First, steps of a process of producing an optical waveguide of the invention will be described sequentially with reference to FIG. 1.

1) Step of preparing mold having cured resin layer of mold-forming curable resin and concave portion corresponding to core convex portion A mold is preferably prepared with a master (mold with which a mold for optical waveguide is formed) having a convex portion corresponding to an optical waveguide core (hereinafter referred to as a "core"). However, a mold forming method is not limited to such a method. A method for producing a mold in which a master is employed will be described below.

Formation of Master

In order to form a master 10 (shown in FIG. 1A) having a convex portion 12 corresponding to a core, a conventional method, such as a photolithographic method or an RIE method, can be conducted without any limitation. Also, the master 10 can be formed by a method of forming an optical waveguide in accordance with an electrodeposition method or a photoelectrodeposition method (Japanese Patent Application No. 2002-10240 filed earlier by Fuji Xerox Co., Ltd.).

The convex portion 12 of the master 10 which convex portion corresponds to the core is rectangular parallelopiped with square edge surfaces having an edge of about 5 μm to about 500 μm, and preferably about 40 μm to about 200 μm. The size of the convex portion 12 depends on use of the optical waveguide. For example, in the case of a single-mode optical waveguide, the optical waveguide generally has a core having a square cross-section whose edge is about 10 μm. In the case of a multi-mode optical waveguide, the optical waveguide generally has cores each having a square cross-section whose edge is about 50 μm to about 100 μm. However, according to use thereof, an optical waveguide with at least one larger core having a square cross-section whose edge is several hundreds μm.

Formation of Mold

Next, steps of forming a mold 20 will be described.

Figure 1A:
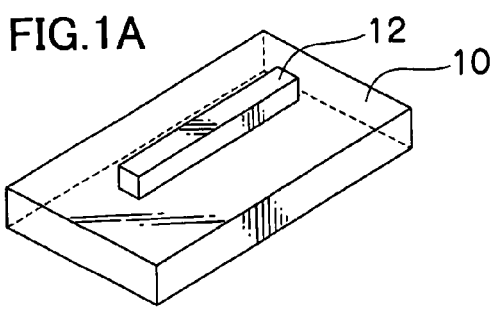
FIGS. 1A to 1H are perspective views showing a process of producing an optical waveguide of the first embodiment of the invention.
Figure 1E:
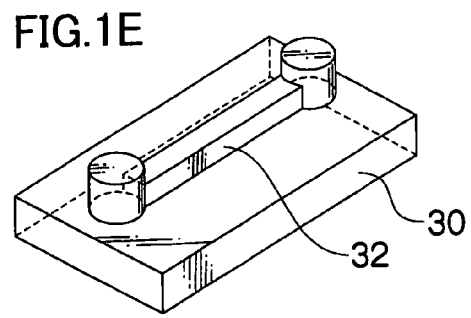
Figure 1B:
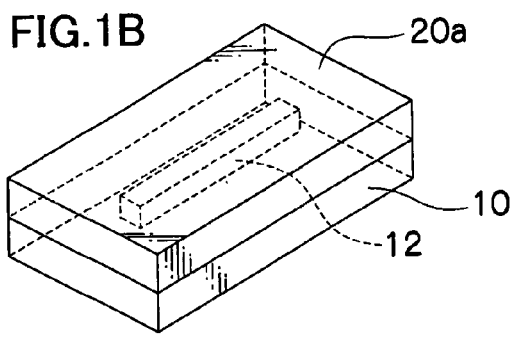

As shown in FIG. 1B, a mold-forming curable resin is applied to the master 10 or injected into space formed between the master 10 and a cover (not shown) disposed over the master 10 to form a layer of the resin on the master 10. The layer is dried, if necessary. Then, the layer is cured. The resultant cured layer 20a is separated from the master 10. Thus, a mold precursor having a concave portion 22 corresponding to the convex portion 12 is formed.

Figure 1F:
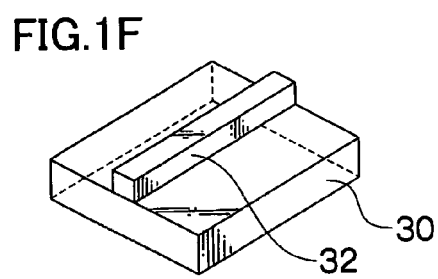
Figure 1C:
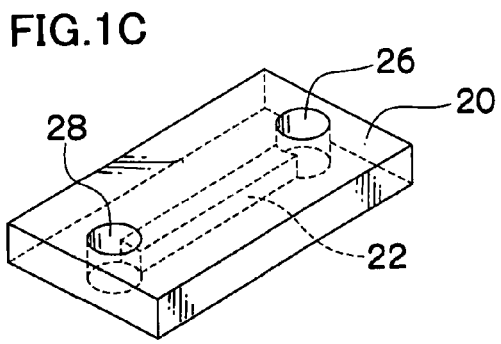

Then, as shown in FIG. 1C, the mold precursor is punched to form an inlet port 26 from which a core-forming curable resin is introduced into the concave portion 22, and a discharge port 28 from which the resin in the concave portion 22 is gotten out.

The inlet port 26 and the discharge port 28 can also be formed in accordance with various methods other than punching. For example, the inlet port 26 and the discharge portion 28 can also be formed as follows. After the cured resin layer of the mold-forming curable resin is formed on the master, the cured resin layer is separated from the master to prepare a mold precursor. Then, the end portions of the mold precursor are cut off so that the ends of the concave portion are exposed. As described above, a method of forming an inlet port 26 and a discharge port 28 is not particularly limited to specific methods.

The inlet port 26 and discharge port 28 which communicate with the concave portion 22 of the resultant mold 20 are provided respectively at the ends of the concave portion 22. Therefore, the inlet port 26 can be used as a reservoir for a liquid (resin). Moreover, the interior of the concave portion 22 can be made to communicate with a vacuum suction apparatus by inserting a vacuum suction pipe into the discharge port 28. A resin can be introduced into the concave portion 22 through the inlet port 26 under a reduced pressure by connecting a core-forming curable resin-injecting pipe to the inlet port 26. When the mold has plural concave portions 22, plural discharge ports 28 may be provided with respect to the concave portions 22 on a one-to-one relation basis, or one discharge port 28 which is common to the discharge ports 28 may be provided.

The thickness of the cured resin layer is suitably determined in view of the handling property of the mold 20, and generally is about 0.1 mm to about 50 mm. By beforehand subjecting the master 10 to mold release treatment, for example, by coating the master 10 with a mold release agent, the cured resin layer 20a can be easily separated from the master 10, and separation of the mold 20 from the master 10 can be promoted.

It is preferable that the mold-forming curable resin is easily separated from the master 10, has mechanical strength and dimensional stability necessary for the mold 20, which is used repeatedly, has sufficient hardness to retain the shape of the concave portion 22, and has sufficient adhesion with respect to a clad substrate 30 described later. Additives can be added to the mold-forming curable resin, if necessary.

The mold-forming curable resin must be able to be applied to the surface of the master 10 or injected into space formed between the master 10 and the cover (not shown) disposed over the master 10 and accurately transfer the convex portion 12 of the master 10 corresponding to the core. Therefore, the mold-forming curable resin preferably has a viscosity not more than the necessity, for example, a viscosity of about 500 mPa·s to about 7,000 mPa·s. In order to adjust the viscosity of the mold-forming curable resin, a solvent can be added to the mold-forming curable resin in such an amount that does not adversely affect the resin. Examples of "the mold-forming curable resin" used in the invention include a resin which forms an elastic rubber-like body when cured.

In view of separation property, mechanical strength, dimensional stability, hardness and adhesion between the mold and a clad substrate, curable organopolysiloxane, which becomes a silicone rubber (silicone elastomer) or a silicone resin when cured, is preferably used as the mold-forming curable resin. The curable organopolysiloxane preferably includes at least one methylsiloxane group, at least one ethylsiloxane group, and/or at least one phenylsiloxane group in the molecule thereof. The curable organopolysiloxane may be a one-component curable resin or can be used in combination with a curing agent as a two-component curable resin. Further, the curable organopolysiloxane may be a thermosetting resin, a resin which can be cured at room temperature (for example, a resin which can be cured with moisture in air), or a resin which can be cured in any other manner (for example, an ultraviolet-curable resin).

The curable organopolysiloxane is preferably a resin which becomes silicone rubber when cured. Examples of such curable organopolysiloxane include one usually called "liquid silicone rubber". Examples of the "liquid silicone rubber" include one having a high viscosity like paste-like silicone rubber. The liquid silicone rubber is preferably used in combination with a curing agent as two-component silicone rubber. Above all, it is preferable to use addition-type liquid silicone rubber. The reasons for this are as follows. Such silicone can be cured in a short period of time so that the surface and inner portion of the silicone layer are uniformly cured. Moreover, no or little by-products occur during curing. Furthermore, it exhibits excellent separation property and a low rate of shrinkage.

Among liquid silicone rubbers, liquid dimethylsiloxane rubber is particularly preferable since adhesion, separation property, strength and hardness thereof can be easily controlled. Since a cured product of the liquid dimethylsiloxane rubber usually has a low refractive index of about 1.43, a mold made from the liquid dimethylsiloxane rubber can be used as a clad layer without separating the mold from a clad substrate. In this case, it is necessary to take a measure to prevent the mold, the core-forming resin and the clad substrate separating from each other.

The liquid silicone rubber is required to accurately transfer the convex portion 12 corresponding to the core, and the amount of bubbles included in the silicone rubber must be as low as possible so as to easily degass the silicone rubber, and the mold with a thickness of several millimeters must be made from the liquid silicone rubber. In view of these, the viscosity of the liquid silicone rubber is preferably about 500 mPa·s to about 7,000 mPa·s, and more preferably about 2,000 mPa·s to about 5,000 mPa·s.

The surface energy of the mold 20 is preferably in the range of from about 10 dyn/cm to about 30 dyn/cm, and more preferably in the range of from about 15 dyn/cm to about 24 dyn/cm in view of adhesion between the mold and a substrate film and speed of penetration of the core-forming curing resin.

The shore rubber hardness of the mold 20 is preferably about 15 to about 80, and more preferably about 20 to about 60 in view of molding performance, retention of the shape of the concave portion and separation property of the mold.

The surface roughness (root mean square roughness (RMS)) of the mold 20 is preferably not larger than 0.5 μm, and more preferably not larger than 0.1 μm, and still more preferably not larger than 0.05 μm. The surface roughness in the above can greatly reduce light loss with respect to optical waveguide characteristics of the formed core. The surface roughness is preferably not larger than ½ of the wavelength of light to be used. When it is not larger than 1/10 of the wavelength, waveguide loss of the light due to the surface roughness is reduced to an almost negligible level.

The mold 20 preferably has a light-transmitting property in the ultraviolet region and/or the visible region. When the mold 20 has a light-transmitting property in the visible region, the mold 20 can be easily positioned at the time that the mold 20 is brought into close contact with the clad substrate 30 (see FIG. 1D) in Step 2) described later. Moreover, a process of filling the concave portion 22 of the mold 20 with the core-forming curing resin in Step 3) described later can be observed, and completion of the filling operation can be easily confirmed.

The reason why the mold 20 preferably has a light-transmitting property in the ultraviolet region is as follows. When an ultraviolet-curable resin is used as the core-forming curable resin, the core-forming curable resin can be cured by ultraviolet light through the mold 20. Therefore, the mold 20 preferably has a transmittance of not smaller than 80% in the ultraviolet region (300 nm to 400 nm).

The curable organopolysiloxane, particularly liquid silicone rubber which becomes silicone rubber when cured, exhibits excellent adhesion and separation property, which are contrary to each other, relative to the clad substrate 30, has an ability to transfer a nanostructure, and, when the silicone rubber is brought into contact with the clad substrate 30, can even prevent intrusion of liquid. The mold 20 made of such silicone rubber can highly precisely transfer the shape of the master 10, and can firmly adhere to the clad substrate 30. Therefore, only the concave portion 22 between the mold 20 and the clad substrate 30 can be filled with the core-forming curable resin. Furthermore, the clad substrate 30 and the mold 20 can be easily separated from each other. Therefore, an optical waveguide whose shape is highly precisely maintained can be quite easily formed with the mold 20.

Furthermore, when the cured resin layer has elasticity, a part of the cured resin layer, that is, a portion other than a portion which transfers the convex portion 12 of the master 10, can be replaced with a rigid material. In this case, the handling property of the mold 20 is enhanced.

2) Step of bringing clad substrate 30 into close contact with mold 20

The clad substrate (clad portion) 30 is brought into close contact with the mold 20. A glass substrate, a ceramic substrate, or a plastic substrate can be used as the clad substrate 30 without any limitation. When a polymer compound such as plastics is used as the material of the clad substrate 30, the clad portion can be easily formed into a desired shape. Moreover, material costs can be reduced, and in turn production costs are reduced.

A substrate having a resin coating thereon is also used to control the refractive index of the substrate. The refractive index of the clad substrate 30 is preferably less than 1.55, and more preferably less than 1.50. In particular, this refractive index need to be smaller than the refractive index of the core 32 (see FIG. 1F) by at least 0.01. Preferably, the clad substrate 30 is planar, and exhibits excellent adhesion with respect to the mold 20 such that, when the two are brought into close contact with each other, a gap other than the concave portion 22 does not occur between the clad substrate 30 and the mold 20.

The optical waveguide having a flexible plastic film substrate can be used as optical wiring between a coupler and a board, or an optical branching filter. The type of the film substrate is suitably selected such that optical characteristics such as refractive index, and light-transmitting property, mechanical strength, heat resistance, adhesion between the film substrate and the mold, and/or flexibility suitable for use of the optical waveguide to be produced can be obtained.

Examples of the material of the film substrate include acrylic resins (such as polymethyl methacrylate), alicyclic acrylic resins, styrene resins (such as polystyrene and acrylonitrile-styrene copolymer), olefin resins (such as polyethylene, polypropylene and ethylene-propylene copolymer), alicyclic olefin resins, vinyl chloride resins, vinylidene chloride resins, vinyl alcohol resins, vinyl butyral resins, allylate resins, fluorinated resins, polyester resins (such as polyethylene terephthalate and polyethylene naphthalate), polycarbonate resins, cellulose diacetate and cellulose triacetate, amide resins (such as aliphatic polyamide and aromatic polyamide), imide resins, sulfonic resins, a polyether sulfonic resins, polyether ether ketone resins, polyphenylene sulfide resins, and polyoxymethylene resins, and mixtures of resins.

When the film substrate does not exhibit good adhesion with respect to the mold 20 and the core 32, the film substrate is preferably treated in ozone atmosphere, or is preferably irradiated with ultraviolet light having a wavelength of not larger than 300 nm, thereby improving its adhesion to the mold 20 and the core 32.

Examples of the alicyclic olefin resins include one having a norbornene structure at the main chain thereof, and one having a norbornene structure at the main chain thereof and also having a polar group, such as an alkyloxycarbonyl group whose alkyl group has 1 to 6 carbons, or a cycloalkyl group, at the side chain(s) thereof. Above all, an alicyclic olefin resin having a norbornene structure at the main chain thereof and also having a polar group, such as an alkyloxy carbonyl group, at the side chain(s) thereof exhibits excellent optical characteristics such as a low refractive index (The refractive index is around 1.5, which can ensure sufficient difference in refractive index between the film substrate and the core 32 or the clad substrate 30) and high light-transmitting property, exhibits excellent adhesion to the mold 20, and has excellent heat resistance.

The refractive index of the film substrate is preferably less than 1.55, and more preferably less than 1.53 so that the difference in refractive index between the film substrate and the core 32 can be secured.

The thickness of the film substrate is suitably determined in view of flexibility, rigidity, and/or handling property of the film substrate, and is preferably about 0.1 mm to about 0.5 mm.

Figure 1G:
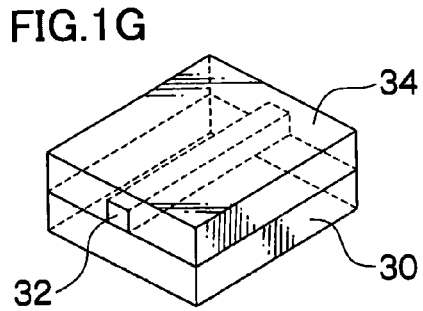
Figure 1D:
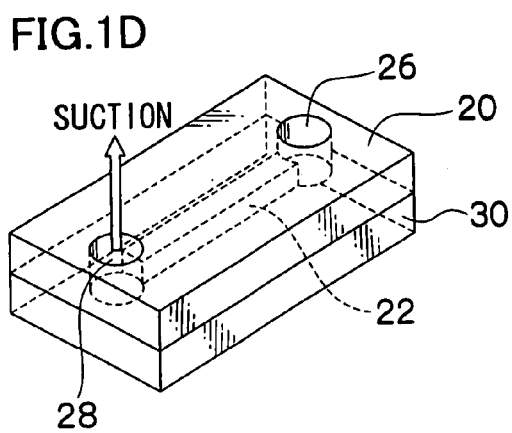

3) Step of filling concave portion 22 of mold 20 with which clad substrate 30 is brought into contact, with core-forming curable resin As shown in FIG. 1D, the core-forming curable resin is injected into the inlet port 26 formed at the one end of the concave portion 22, and the internal pressure of the concave portion 22 is reduced and the internal air thereof is sucked via a tube connected to a suction unit and the discharge port 28 formed at the other end of the concave portion 22, whereby the concave portion 22 is filled with the core-forming curable resin.

A method of filling the concave portion 22 with the core-forming curable resin is not limited to the above method. For example, a method in which a small amount of the core-forming curable resin is dropped into the inlet port 26 and the concave portion 22 is filled with the resin due to capillary action, a method in which the concave portion 22 is filled with the core-forming curable resin by introducing the resin to the concave portion 22 through the inlet port 26 under pressure, a method in which the internal pressure of the concave portion 22 is reduced and the internal air thereof is sucked via a tube connected to a suction unit and the discharge port 28, or a method in which filling of the concave portion 22 is conducted by introducing the resin to the concave portion 22 through the inlet port 26 under pressure, by reducing the internal pressure of the concave portion 22 and by sucking the internal air thereof via a tube connected to a suction unit and the discharge port 28 can be conducted. When the resin is introduced to the concave portion 22 through the inlet port 26 under pressure, and the internal pressure of the concave portion 22 is reduced, and the internal air thereof is sucked via a tube connected to a suction unit and the discharge port 28, it is preferable to synchronically conduct the filling under pressure and the sucking. In such a method, the mold 20 is stably fixed, and, in this state, pressure is gradually increased in the filling operation under pressure, while pressure is gradually decreased in the sucking operation. Thereby, the concave portion 22 can be filled with the core-forming curable resin at higher speed. When the concave portion 22 is filled with the core-forming curable resin due to capillary action, it is preferable to reduce the internal pressure of the concave portion 22 to about 0.1 kPa to about 100 kPa so as to accelerate the filling of the concave portion 22. Furthermore, in order to accelerate the filling of the concave portion 22, a method can be conducted in which the internal pressure of the concave portion 22 is reduced and the core-forming curable resin to be introduced through the inlet port 26 of the mold 20 is heated to lower the viscosity of the resin. This method is also effective.

As the core-forming curable resin, an ultraviolet-curable resin, a radiation-curable resin, an electron radiation-curable resin, or a thermosetting resin can be used. Among theses, the core-forming curable resin is preferably an ultraviolet-curable resin and/or a thermosetting resin. An ultraviolet-curable or thermosetting monomer, an ultraviolet-curable or thermosetting oligomer, or a mixture of the monomer and the oligomer is used as the ultraviolet-curable resin or thermosetting resin for forming a core. Preferably, an epoxy resin, a polyimide resin and/or an acrylic ultraviolet-curable resin is used as the ultraviolet-curable resin. When the core is made from not a silicon substrate or a glass substrate, but a polymer compound, material costs can be reduced, and in turn production costs can be reduced. Moreover, since the core is made of a polymer compound such as an ultraviolet-curable resin, a radiation-curable resin and/or an electron radiation-curable resin, the core can be easily formed into a desired shape.

It is necessary that the viscosity of the core-forming curable resin be low so as to fill the cavity (concave portion 22) formed between the mold 20 and the clad substrate 30 therewith. The viscosity of the curable resin is preferably about 10 to about 2,000 mPa·s, more preferably about 100 to about 1,000 mPa·s, and still more preferably about 300 to about 700 mPa·s to accelerate the filling speed, to obtain a precisely-shaped core, and to reduce light loss.

Further, the difference in volume (i.e., a volume change) between the curable resin and the cured resin need to be small so that the original shape of the convex portion 12 of the master 10 corresponding to the core can be highly precisely reproduced. For example, reduction of volume causes waveguide loss. Therefore, the curable resin preferably has a volume change as small as possible. The volume change is preferably not larger than 10%, and is more preferably in the range of from about 0.01% to about 4%. When the viscosity of the curable resin is lowered by use of a solvent, the volume change (the difference between the curing resin and the cured resin) becomes large. Therefore, it is preferable to avoid use of a solvent. When the core-forming curable resin is a material having a volume shrinkage rate of not larger than 0.01%, or a material whose volume expands, efficiency decreases and surface deterioration such as fracture of the surface of the cured resin layer occurs at the time that the cured resin layer is separated from the mold 20. As a result, the smoothness of the surface of the formed core 32 deteriorates, and optical waveguide loss increases. Therefore, use of these materials is not preferred.

In order to decrease the volume change (shrinkage) of the cured core-forming curable resin, a polymer can be added to the resin. Preferably, the polymer to be added is compatible with the core-forming curable resin, and does not adversely affect the refractive index, elastic modulus and light-transmitting property of the resin. By adding the polymer, the volume change can be reduced, and the viscosity and the glass transition point of the curable resin can be precisely controlled. The polymer is, for example, an acrylic resin, a methacrylate resin or an epoxy resin, but is not limited to these resins.

The refractive index of the cured product of the core-forming curable resin is preferably in the range of from about 1.2 to about 1.6, and more preferably in the range of from about 1.4 to about 1.6. Two or more resins which have different refractive indexes and the cured products made from which have a refractive index within the above range can be used as the core-forming curable resin.

The refractive index of the cured product of the core-forming curable resin need to be larger than the refractive index of the film substrate (including the clad layer in Step 5) described later) serving as the clad substrate 30. The difference in refractive index between the core and the clad substrate or layer is preferably not smaller than 0.01, and more preferably not smaller than 0.05.

4) Step of curing core-forming curable resin

The core-forming curable resin, with which the concave portion 22 has been filled in the above Step 3), is cured. In order to cure the ultraviolet-curable resin, an ultraviolet lamp, an ultraviolet LED, and/or a UV irradiation apparatus is used. In order to cure the thermosetting resin, the resin is heated, for example, in an oven.

5) Step of separating mold 20 from clad substrate 30

After the above Step 4), the mold 20 is separated from the clad substrate 30. As shown in FIG. 1E, a core 32, and cured resin portions which were respectively disposed in the inlet port 26 and the discharge port 28 are formed on the clad substrate 30. Then, as shown in FIG. 1F, the cured resin portions are removed by grinding. As a result, only the core (waveguide core) 32 remains on the clad substrate 30. The end surfaces of the core 32 have specular (mirror finished surface-like) smoothness.

The mold 20 used in the above Steps 1) to 4) can be used as a clad layer if the mold meets requirements for the clad layer, such as refractive index. In this case, it is unnecessary to separate the mold from the clad substrate. Moreover, the mold is preferably subjected to ozone treatment so as to enhance adhesion between the mold and the core material.

6) Step of forming clad layer on clad substrate 30 having core 32 hereon

As shown in FIG. 1G, the clad layer 34 is formed on the clad substrate 30 having the core 32 thereon. Examples of the clad layer 34 include a film (for example, a clad substrate the same as that used in Step 2), a layer obtained by curing a coating of a clad curable resin, and a polymer film obtained by drying a coating of a solution in which a polymer material is dissolved in a solvent. An ultraviolet-curable resin or a thermosetting resin is preferably used as a curable resin for the clad. For example, an ultraviolet-curable or thermosetting monomer, an ultraviolet-curable or thermosetting oligomer, or a mixture of the monomer and the oligomer is used as such.

In order to decrease volume change (shrinkage) of the clad-forming curable resin, a polymer, such as a methacrylic resin or an epoxy resin, which is compatible with the clad-forming curable resin and does not adversely affect the refractive index, elastic modulus and light-transmitting property of the resin, can be added to the clad-forming curable resin (ultraviolet-curable resin or thermosetting resin).

When a film is used as the clad layer 34, the film is bonded to the clad substrate with an adhesive. Here, it is preferable that the refractive index of the adhesive be close to the refractive index of the film. The adhesive is preferably a thermosetting resin adhesive and/or an ultraviolet resin adhesive. For example, an ultraviolet-curable or thermosetting monomer, an ultraviolet-curable or thermosetting oligomer, or a mixture of the monomer and the oligomer is used as such. In order to decrease volume change (shrinkage) between the ultraviolet-curable resin and the cured ultraviolet-curable resin or between the thermosetting resin and the cured thermosetting resin, a polymer similar to the polymer which can be added to the clad layer 34 can be added to this film.

It is preferable that the difference in refractive index between the clad substrate 30 and the clad layer 34 be small. In order to effectively confine light, this difference is preferably not larger than 0.1, more preferably not larger than 0.05, and still more preferably not larger than 0.001, and most preferably zero.

The clad layer 34 which is a layer obtained by curing a coating of a clad curing resin, or a polymer film obtained by drying a coating of a solution in which a polymer material is dissolved in a solvent can be formed directly on the clad substrate or can be bonded to the clad substrate film, for example with an adhesive (an ultraviolet-curable resin or a thermosetting resin), and the adhesive is cured. In order to cure the ultraviolet-curable resin adhesive, an ultraviolet lamp, an ultraviolet LED, and/or a UV irradiation apparatus is used. In order to cure the thermosetting resin adhesive, the resin is heated, for example, in an oven.

The optical waveguide 38 is formed in accordance with these steps.

Figure 1H:
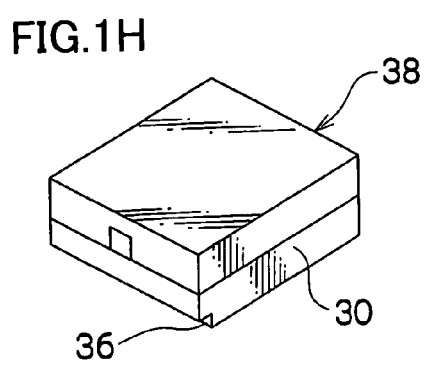

7) Step of forming concave portion 36 in optical waveguide 38 or convex portion on optical waveguide A concave or convex portion, preferably a concave portion, is formed at the optical waveguide 38. In FIG. 1H, a concave portion (step portion) 36 is formed in the clad substrate 30 of the optical waveguide 38 thus formed. The step portion is formed by machining such as polishing. The thickness of a portion of the clad substrate which portion is an extension of the concave or convex portion in the longitudinal direction (extending direction) of the optical waveguide core is different from that of other portion of the clad substrate in the longitudinal direction of the optical waveguide core.

A method of forming the step portion 36 is not limited to machining. For example, the step portion can be formed at the time that the clad substrate 30 is formed. In this case, a method can also be used in which a mold having a convex portion is formed as in Step 1), and the material of a clad substrate is coated on the upper surface of this mold in accordance with a spin coating method, and the resultant coating is cured, and the resulting cured layer is separated from the mold. Alternatively, another method can also be used in which a convex portion is formed on a pressure roll, and the pressure roll is pressed against a clad substrate to form a step portion in the clad substrate. In order to provide a step-shape, the recessed surface is cut by a dicing saw, for example.

The step portion is preferably formed by removing or cutting a solid having a square cross-section from the optical waveguide. The solid having a square cross-section is, for example, a rectangular parallelepiped, and the step portion can be obtained by cutting a solid having a rectangular parallelepiped shape from the clad portion of the optical waveguide. When the optical waveguide has a step portion having such a shape, the step portion formed at the surface of the clad portion abuts the convex portion or the concave portion of an optical waveguide ferrule described later and is positioned at the time that the optical waveguide is inserted into the opening portion of the optical waveguide ferrule.

The step portion can be formed such that the remaining clad portion surrounding the core has a thickness of at least 5 μm. When the optical waveguide has a width of 2 mm and a length of 100 mm, the width of the step portion in the longitudinal direction of the optical waveguide core is preferably about 0.010 mm to about 1 mm, and the length of the step portion in the direction parallel to the thickness of the optical waveguide is preferably about 0.010 mm to about 1 mm.

Optical Waveguide Ferrule and Optical Connector

An optical waveguide ferrule of the invention has an opening portion for receiving the optical waveguide of the invention and, when the optical waveguide has a concave portion, has a convex portion, or, when the optical waveguide has a convex portion, has a convex portion having a concave portion. The concave or convex portion of the optical waveguide can be engaged with the convex or concave portion of the optical waveguide ferrule.

An optical connector of the invention includes the optical waveguide and the optical waveguide ferrule having an opening portion for receiving the optical waveguide and a convex portion or a convex portion having a concave portion, and the optical waveguide and the optical waveguide ferrule are engaged with each other.

The ferrule preferably has at least one pillar-shaped convex portion (protrusion). When the pillar-shaped convex portion is formed in the opening portion of the optical waveguide ferrule, the optical waveguide having the above-described step portion can be positioned at the time that it is inserted into the opening portion. By forming the convex portion of the optical waveguide ferrule into such a shape, the volume of the optical waveguide ferrule can be lower than that of an optical waveguide ferrule having a step portion (convex portion) whose length is substantially equal to the width of the optical waveguide. Therefore, the amount of the material of the connector can be reduced, and costs can be reduced.

The front end surface of the optical waveguide preferably coincides with the front end surface of the optical waveguide ferrule when the optical waveguide has been fit in position in the optical waveguide ferrule.

In the case of this construction, merely by connecting the resultant optical connector to the optical fiber connector, the front end surfaces of the optical waveguide and the optical waveguide ferrule which coincide with each other coincide with one end surface of each of the connector waveguide cores of the optical fiber connector, and therefore a special alignment operation is not necessary. For this reason, the connecting operation is not complicated, and costs can be reduced.

Figure 2A:
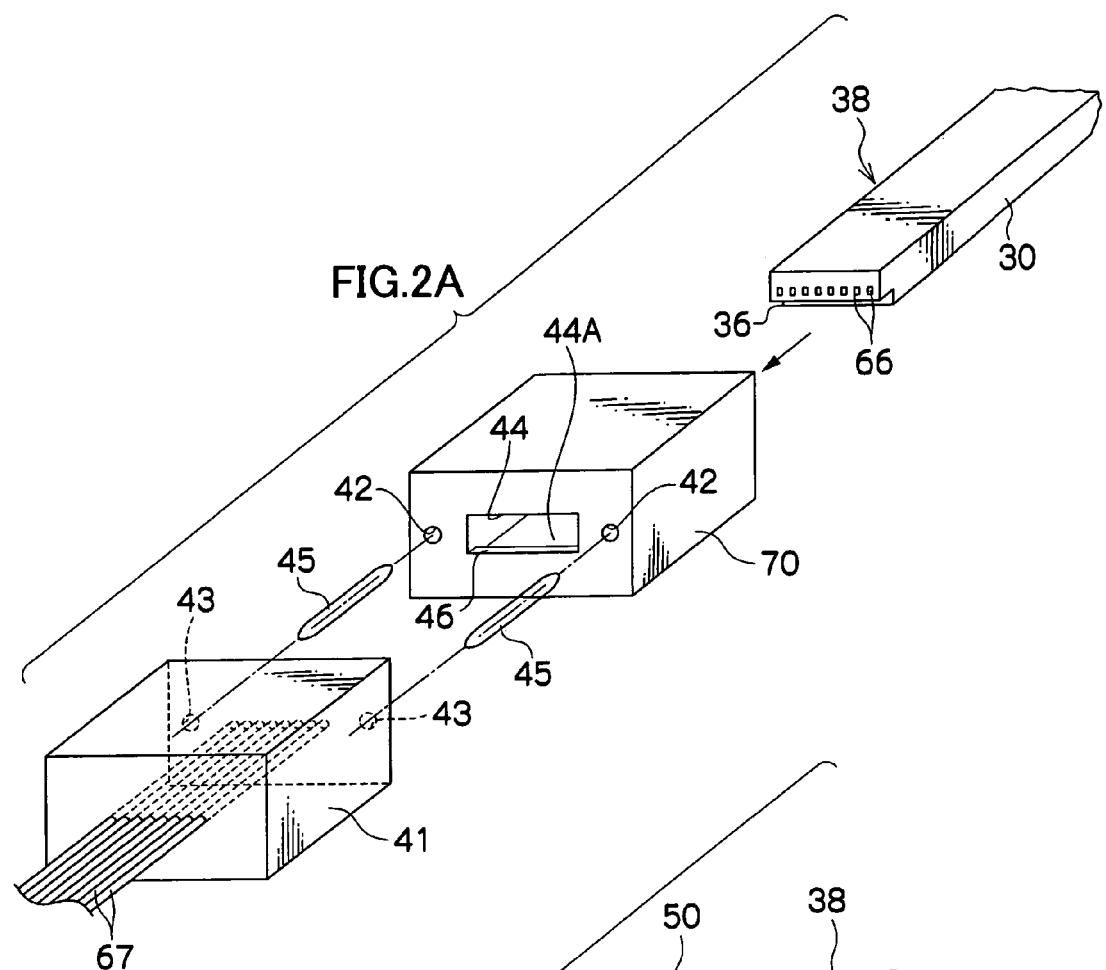
FIGS. 2A and 2B are perspective views showing a process of producing an optical connector of the first embodiment of the invention.

As shown in FIG. 2A, the optical waveguide ferrule 70 has an opening portion 44 into which the optical waveguide 38 is inserted. A protruding portion 46 of high dimensional accuracy which, when the optical waveguide 38 is inserted into the optical waveguide ferrule, abuts the step portion 36 of the optical waveguide 38 to position the optical waveguide 38 is formed in the opening portion 44. The step portion 36 of the optical waveguide 38 and the protruding portion 46 of the optical waveguide ferrule 70 are so structured that the front end surface of the optical waveguide 38 coincides with the front end surface of the optical waveguide ferrule 70 when the optical waveguide 38 has been fully fit into the opening portion 44 of the optical waveguide ferrule 70. As the material of the optical waveguide ferrule 70, an epoxy resin, or polyphenylene sulfide can be used. By adding inorganic glass powder such as quartz to the material, the mechanical strength and precision of the shape of the ferrule are enhanced. The ferrule is formed by injection-molding, or transfer-molding the material.

Figure 2B:
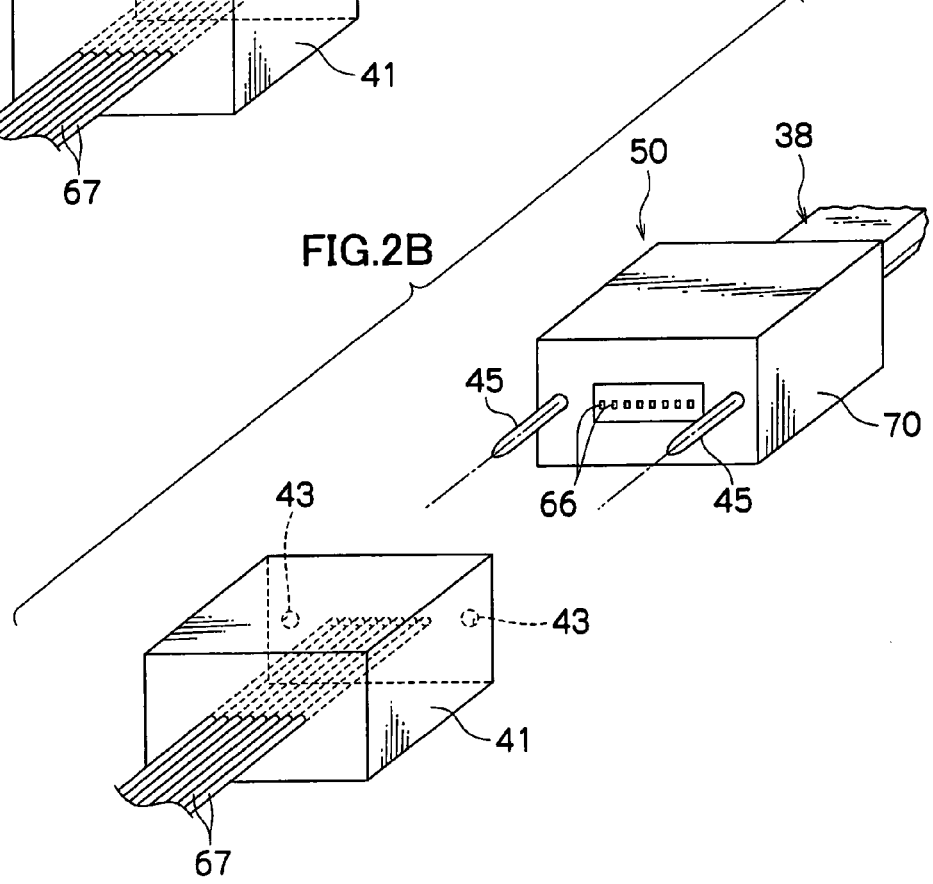
Figure 3A:
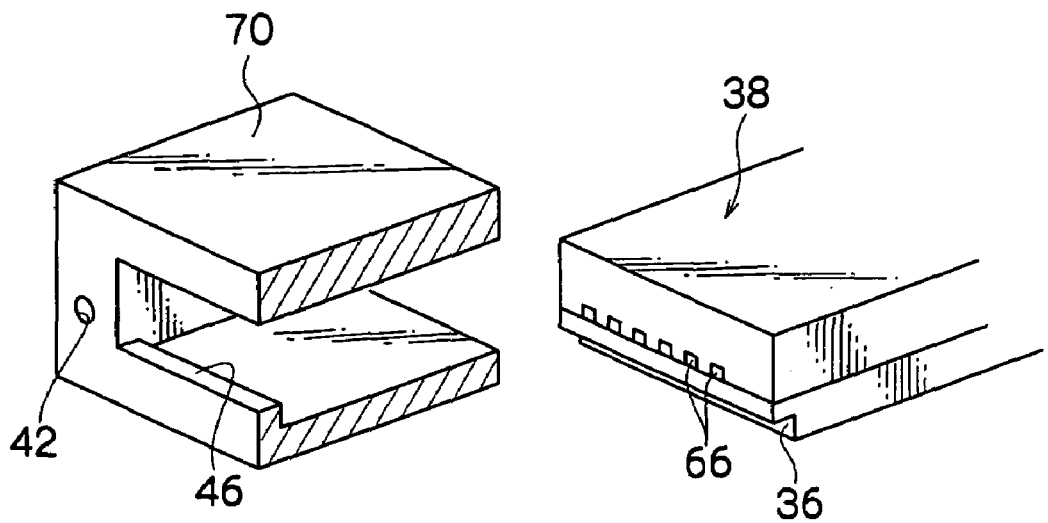
FIGS. 3A and 3B are perspective views showing a process of inserting the optical waveguide of FIG. 2 into an optical waveguide ferrule which perspective views have partial cross-sections.
Figure 3B:
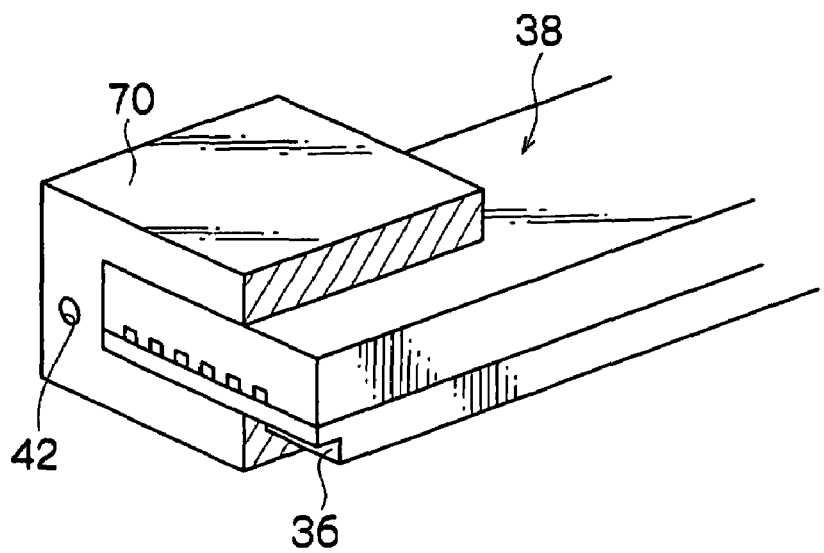

For example, as described above, the protruding portion 46 of high dimensional accuracy which, when the optical waveguide 38 is inserted into the opening portion 44, abuts the step portion 36 of the optical waveguide 38 is formed in the opening portion 44 of the optical waveguide ferrule 70 (FIG. 2A). When the optical waveguide 38 is inserted into the opening portion 44 of the optical waveguide ferrule 70 in a direction indicated by an arrow of FIG. 2A, the optical waveguide 38 is fit in the opening portion 44, with the step portion 36 of the optical waveguide 38 abutting the protruding portion 46 of the optical waveguide ferrule 70 as shown in FIG. 2B. FIGS. 3A and 3B are views showing the optical waveguide ferrule 70 and the optical waveguide 38 of FIG. 2A and partially having a cross section. The optical waveguide 38 is fit in the optical waveguide ferrule 70 to form the optical connector 50 of the invention.

The aforesaid step portion is formed in the direction substantially perpendicular to the longitudinal direction of the optical waveguide cores, and the protruding portion is formed in the opening portion of the optical waveguide ferrule and extends along a direction substantially perpendicular to a direction along which the optical waveguide is inserted into the opening portion. Therefore, a shape for forming the protruding portion can be easily formed on a mold for forming the opening portion for receiving the optical waveguide cores, and a mold having the shape can be pulled out from the ferrule along the same direction as the direction along which the optical waveguide is inserted into the opening portion. That is, the optical waveguide ferrule can be molded by such molds which can be pulled out in two directions. Therefore, production costs of the optical waveguide ferrule can be reduced.

Figure 4A:
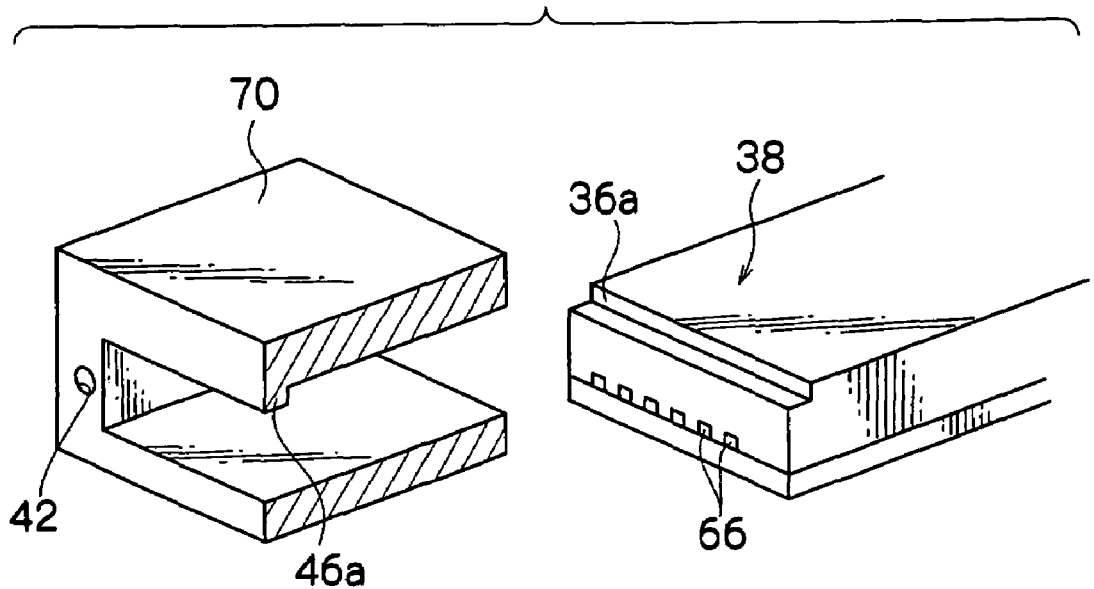
FIGS. 4A and 4B are perspective views showing a process of inserting another optical waveguide into another optical waveguide ferrule which perspective views have partial cross-sections.
Figure 4B:
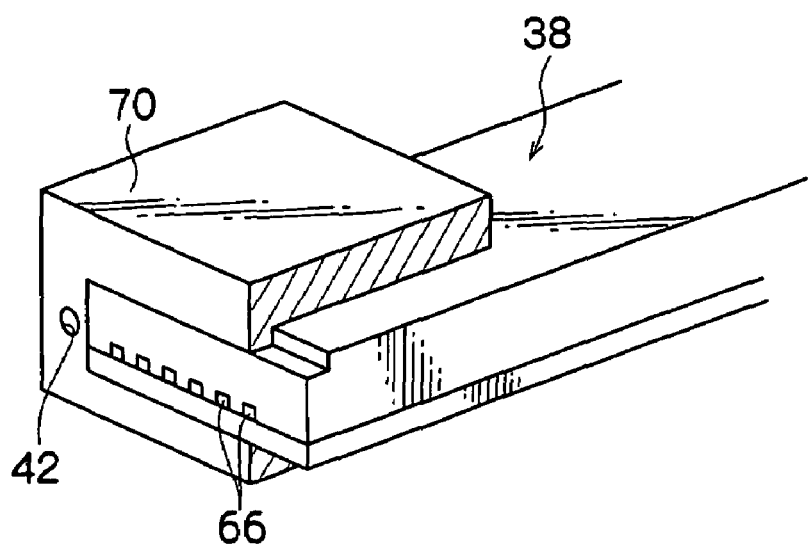
Figure 5A:
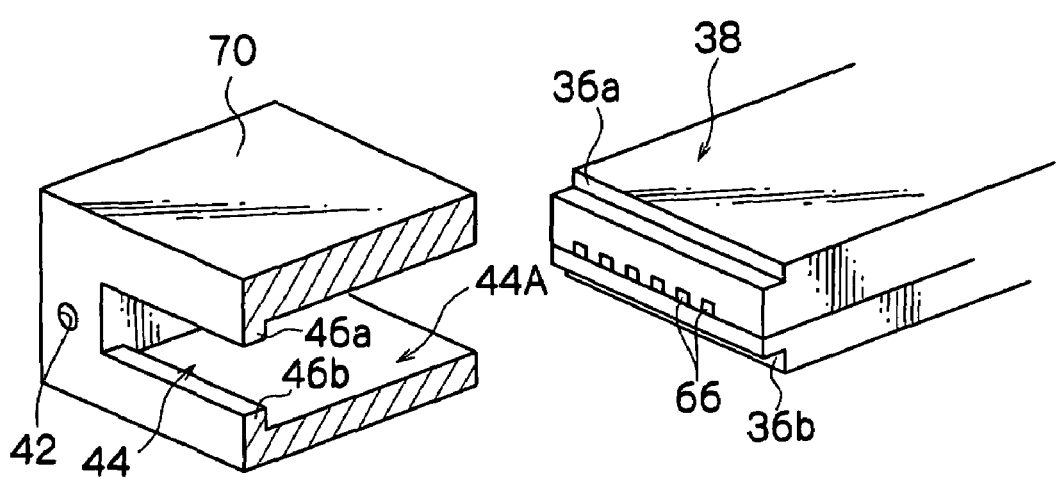
FIGS. 5A and 5B are perspective views showing a process of inserting still another optical waveguide into still another optical waveguide ferrule which perspective views have partial cross-sections.
Figure 5B:
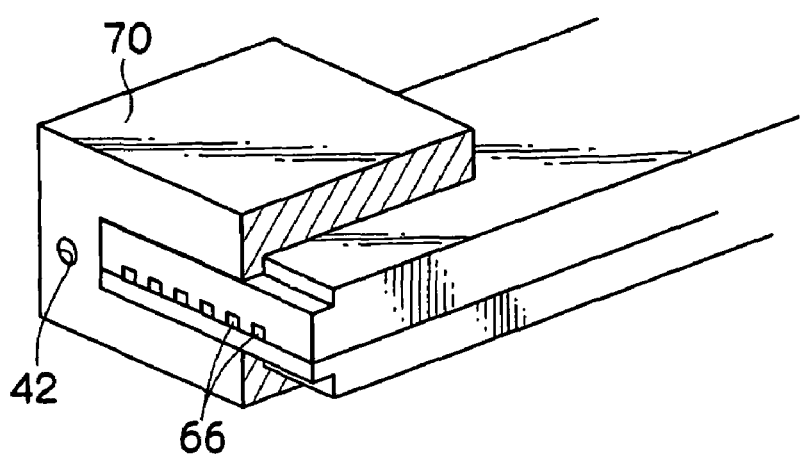

In FIGS. 2 and 3, the step portion is provided at the lower side of the optical waveguide, but the invention is not limited to this construction. FIG. 4 shows another embodiment of the invention in which a step portion 36a and a protruding portion 46a are respectively provided at the upper sides of the optical waveguide and the optical waveguide ferrule. FIG. 5 shows still another embodiment of the invention in which a step portion 36a and a protruding portion 46a are provided at the upper sides of the optical waveguide and the optical waveguide ferrule, and a step portion 36b and a protruding portion 46b are provided at the lower sides. As shown in FIG. 6, pillar-shaped protrusions (convex portions) 48 serving as protruding portions can be formed at the optical waveguide ferrule 70. In FIGS. 4 to 6, elements which are substantially identical to those in FIGS. 2 and 3 are designated by the same reference numerals, respectively.

The optical waveguide 38 is positioned by making the step portion 36 of the optical waveguide 38 abut the protruding portion 46 of the optical waveguide ferrule 70. Then, an adhesive is introduced into a gap between the optical waveguide ferrule 70 and the optical waveguide 38, and the optical waveguide 38 is fixed to the optical waveguide ferrule 70. In order to prevent force, such as deflection or distortion, to displace the optical waveguide 38 relative to the optical waveguide ferrule 70 from being applied to the waveguide and the ferrule, it is preferable that the adhesive does not change its volume (shrinkage) when the adhesive dries or is cured. An adhesive used to bond the clad layer to clad substrate 30 (see FIG. 1G) is suitably used as such.

Pin holes 42 are formed in an end portion of the optical waveguide ferrule 70 which end portion abuts the optical fiber connector when the optical waveguide ferrule is connected to the optical fiber connector. One end portion of a pin 45 is inserted into the pin hole 42, while the other end portion of the pin 45 is inserted into a pin hole 43 in the optical fiber connector 41. As a result, the optical waveguide ferrule 70 is connected to the optical fiber connector 41 in such a manner that the ferrule 70 is positioned relative to the optical fiber connector 41. At this time, the optical axes of cores 66 of the optical waveguide ferrule 70 coincide with the optical axes of corresponding optical waveguides 67 of the optical fiber connector 41.

Then, the optical waveguide ferrule 70 and the optical fiber connector 41 are fixed to each other by a spring clamp (not shown).

EXAMPLES

The invention will be described more specifically hereinafter byway of the following Examples, but the invention is not limited to these Examples.

Example 1

Formation of Master

Figure 7A:
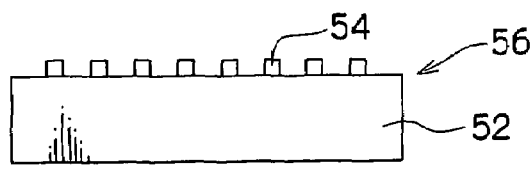
FIGS. 7A to 7H are cross-sectional views showing a process of producing an optical waveguide of Examples of the invention.

A thick-film resist (SU-8 manufactured by Microchemical K.K.) is coated on a silicon substrate 52 in accordance with a spin coating method, and then is pre-baked at 80° C. The resultant coating is exposed to light through a photomask, and is developed. As a result, 8 core-forming convex portions 54 each having a square cross-section, a width of 50 μm, a height of 50 μm, a length of 150 mm, and a proximate width of 250 μm are formed as shown in FIG. 7A. These are post-baked at 120° C. Thus, a core-forming master 56 is prepared.

Formation of Mold

Figure 7B:
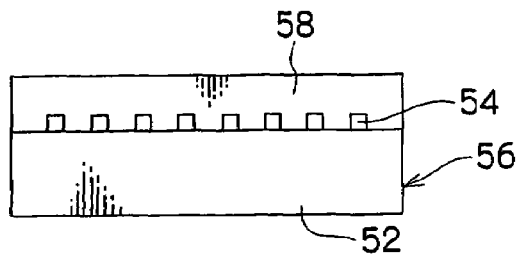
Figure 7C:

Next, a mold release agent is coated on the master 56, and a mixture (mold material 58) of thermosetting liquid dimethylsiloxane rubber (SYLGARD 184 manufactured by Dow Corning Co. and having a viscosity of 5,000 mPa·s) and a hardener is poured on the master 56, and is heated at 120° C. for 30 minutes to cure the material as shown in FIG. 7B. Then, the cured mold material 58 is separated from the master 56. Thus, a mold precursor (Mold thickness: 3 mm) having core-forming concave portions 62 is prepared as shown in FIG. 7C. Then, inlet ports (see FIG. 1C) from which an ultraviolet-curable resin is introduced and discharge ports through which the ultraviolet-curable resin is discharged are formed in the mold precursor in such a manner that both ends of each of the core-forming concave portions 62 are exposed to air respectively via the corresponding inlet and discharge ports. Thus, a mold 60 is prepared.

The mold 60 has surface energy of 22 dyn/cm, a Shore rubber hardness of 60, surface roughness of not larger than 10 nm and ultraviolet transmittance of not smaller than 80%. The mold is transparent, and an object beneath this mold can be clearly seen.

Formation of Clad Substrate and Optical Waveguide Cores

Figure 7D:
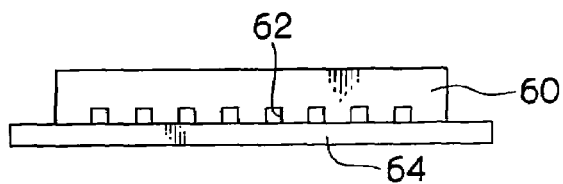

As shown in FIG. 7D, a thick-film (188 μm) clad substrate 64 (Arton film manufactured by JSR K.K. and having a refractive index of 1.510) which is larger than the mold 60 is brought into close contact with the mold 60.

Figure 7E:
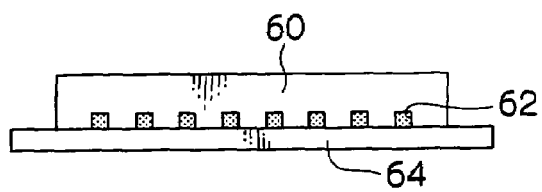

Then, several droplets of ultraviolet-curable resin (PJ3001 manufactured by JSR K.K. and having a viscosity of 1,300 mPa·s) are dripped into each of the inlet ports disposed at one end portion of the mold 60, and each concave portion 62 is filled with the ultraviolet-curable resin due to capillary action as shown in FIG. 7E. Then, the ultraviolet-curable resin is exposed to UV light of 50 mW/cm² through the mold 60 for 5 minutes to cure the ultraviolet-curable resin. Thereafter, the mold 60 is separated from the clad substrate 64.

Figure 7F:
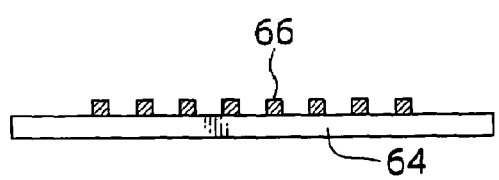

As a result, cores 66 having the same shapes as those of the convex portions 54 of the master 56 are formed on the clad substrate 64 as shown in FIG. 7F. In this Example, the refractive index of each of the cores 66 is 1.591.

Formation of Clad Layer

Figure 7G:
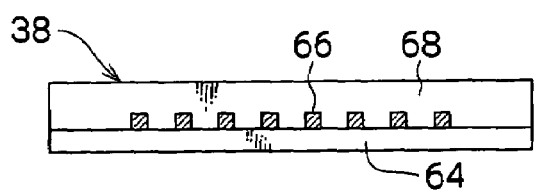
Figure 7H:
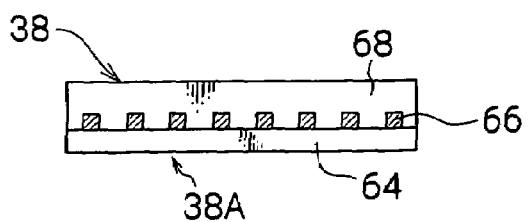
Figure 8:
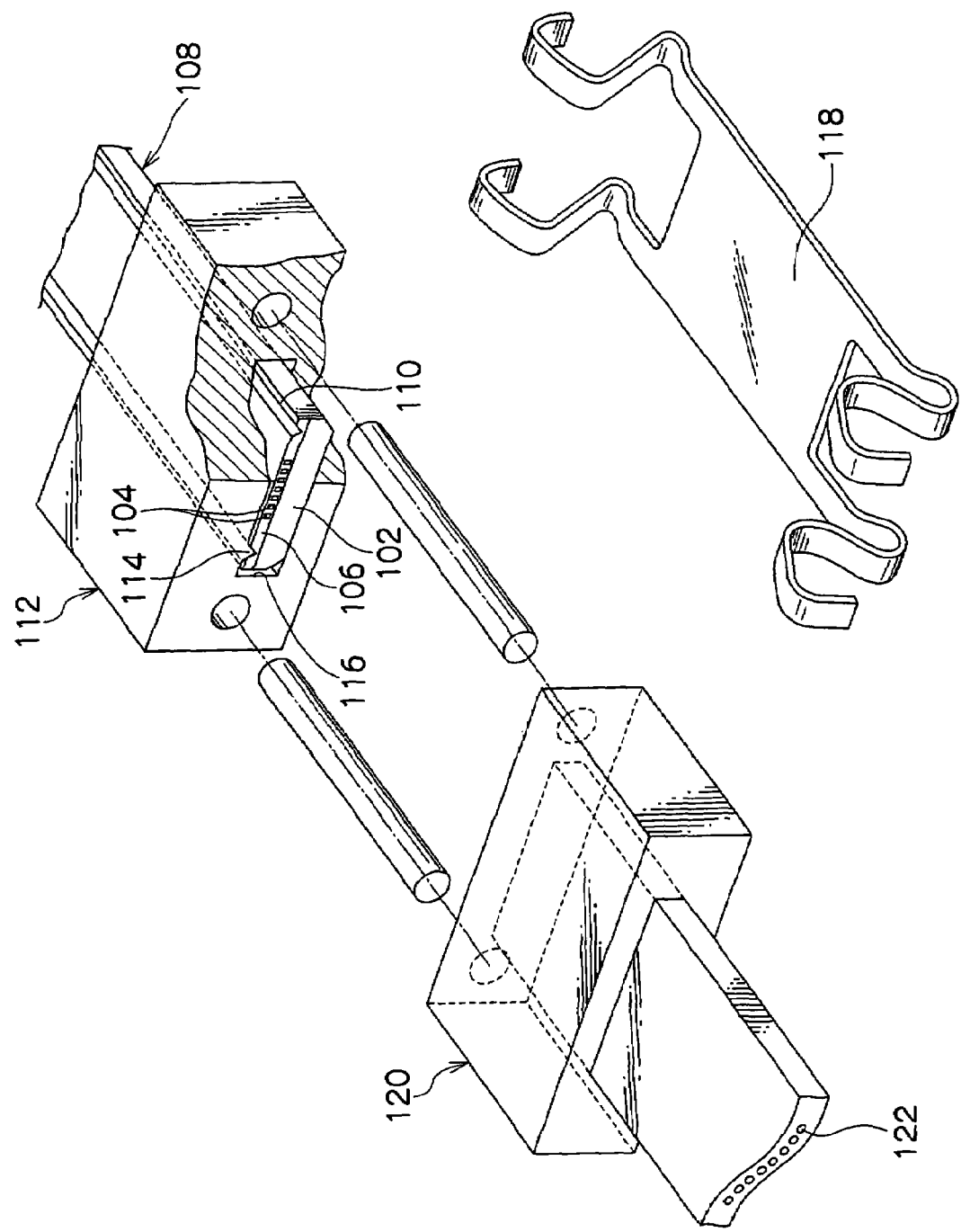
FIG. 8 is a perspective view showing a conventional optical waveguide and a conventional optical waveguide ferrule.

Next, a clad layer 68 is bonded to a surface of the clad substrate 64 which surface has the cores 66 thereon, as shown in FIG. 7G. As the clad layer 68, an ultraviolet-curable adhesive (manufactured by JSR K.K.) having the same refractive index (1.510) as that of the clad substrate 64 when cured is used. Then, the ultraviolet-curable adhesive is exposed to UV light of 50 mW/cm² for 5 minutes through the mold 60, and the clad layer 68 is thereby bonded to the clad layer 64. Thus, an optical waveguide half-finished product is formed.

Formation of Step Portion for Positioning

As shown in FIG. 4, the optical waveguide half-finished product is ground along the longitudinal direction of the cores 66 with a dicing saw (DAD321 manufactured by Disco K.K. and having a blade width of 0.10 mm) so that the side portions of the optical waveguide half-finished product are removed to make the distance between each side edge of the resultant and the corresponding outermost core 66 100 μm. The optical waveguide half-finished product has a length (width) of 2 mm in a direction perpendicular to the longitudinal direction of the cores 66. Also, the optical waveguide half-finished product is ground so that the length thereof in the longitudinal direction of the cores 66 becomes 100 mm.

Then, as shown in FIG. 2, a step portion 36 having a square cross-section, a width of 0.1 mm, and a depth of 0.1 mm is formed in the lower portion of one end portion of the resultant so that the longitudinal direction of the step portion 36 coincides with the direction perpendicular to the longitudinal direction of the cores 66 and so that the transverse direction of the step portion 36 coincides with the longitudinal direction of the cores 66.

This step portion 36 is used to position the optical waveguide 38 relative to an optical waveguide ferrule 70 described later and having a protruding portion 46.

Formation of Optical Waveguide Ferrule

An optical waveguide ferrule 70 is made of an epoxy resin including quartz glass powder in accordance with a transfer-molding method. An opening portion 44 is formed in the optical waveguide ferrule 70 as shown in FIG. 2, and this ferrule 70 has a substantially rectangular shape when viewed from one end thereof. The opening portion 44 is used to accommodate the optical waveguide 38. A protruding portion 46 is formed on an inner lower surface 44A of the ferrule so that it is disposed at an end of the ferrule in the opening portion 44. The protruding portion 46 has a width of 0.1 mm and a height of 0.1 mm.

The optical waveguide 38 is inserted, from an end portion of the optical waveguide ferrule 70 which end portion is opposite the protruding portion, into the opening portion 44 of the optical waveguide ferrule 70, and the step portion 36 of the optical waveguide 38 abuts the protruding portion 46 of the optical waveguide ferrule 70, and the optical waveguide 38 is thereby positioned relative to the optical waveguide ferrule 70. An ultraviolet-curable adhesive (manufactured by JSR K.K.) is dropped into a gap between the inner surfaces of the optical waveguide ferrule 70 and the upper, side and bottom surfaces of the optical waveguide 38, and exposed to UV light of 50 mW/cm² for 5 minutes to cure this adhesive. Thereby, the optical waveguide 38 is fixed to the optical waveguide ferrule 70.

Pin holes 42 are formed in an end portion of the optical waveguide ferrule 70 which end portion abuts an optical fiber connector 41 when the ferrule is connected to the optical fiber connector 41. One end portion of a pin 45 is inserted into the pin hole 42, while the other end portion of the pin 45 is inserted into a pin hole 43 of the optical fiber connector 41. As a result, the optical waveguide ferrule 70 is positioned relative to the optical fiber connector 41 and connected thereto. At this time, the optical axes of cores 66 of the optical waveguide ferrule 70 coincide respectively with the optical axes of optical waveguides 67 of the optical fiber connector 41.

Then, the optical waveguide ferrule 70 and the optical fiber connector 41 are fixed to each other by a spring clamp (not shown).

In the optical waveguide 38 and optical waveguide ferrule 70 formed in accordance with the aforesaid method, the step portion 36 and the protruding portion 46 for positioning are provided so that they extend in the direction perpendicular to the longitudinal direction of the cores 66. When such an optical waveguide 38 is connected to such an optical waveguide ferrule 70, the step portion 36 of the optical waveguide 38 abuts the protruding portion 46 of the optical waveguide ferrule 70, and the optical waveguide 38 is thereby positioned relative to the optical waveguide ferrule 70 in the longitudinal direction of the cores 66. Thus, merely by connecting the optical waveguide 38 to the optical waveguide ferrule 70, the end surface of the optical waveguide 38 coincides with that of the optical waveguide ferrule 70. Moreover, by connecting the resultant optical connector to the optical fiber connector, the optical axes of the cores 66 of the optical waveguide 38 respectively coincide with the optical axes of the optical waveguides 67 of the optical fiber connector 41. Accordingly, a special alignment operation is not necessary. Therefore, the connecting operation is not complicated, and costs can be reduced.

When the optical waveguide ferrule 70 is connected to the optical fiber connector 41, not only the end surfaces of the cores 66, but also the end surface of the optical waveguide ferrule respectively abut the end surfaces of the optical waveguides 67 of the optical fiber connector 41 and the end surface of the optical fiber connector 41. Therefore, damage of the end surfaces of the cores 66, which is caused by a case where abutting of the cores of the optical waveguide 38 and the optical waveguides 67 does not happen together with abutting of the optical waveguide ferrule 70 and the optical fiber connector 41, does not occur, and in turn optical connection loss does not increase.

Further, since the step portion 36 is formed in the lower end portion of the optical waveguide 38 which lower end portion is beneath the end portions of the cores 66, the optical waveguide 38 does not require special space where a portion used to position the optical waveguide 38 relative to the optical waveguide ferrule is formed. Therefore, the width of the optical waveguide 38 does not increase. Even when the number of the cores 66 increases, the width of the optical waveguide 38 corresponds to the width of a row of cores 66 arranged in parallel. Therefore, even when the optical waveguide 38 has a substrate made of a material which does not have so high mechanical strength, such as a silicon substrate or a glass substrate, the optical waveguide 38 does not easily bend down. As a result, increase in optical connection loss due to misalignment of the optical axes can be suppressed.

Example 2

First, an optical waveguide half-finished product is formed in the same manner as in Example 1.

Formation of Step Portion for Positioning

As in Example 1, the optical waveguide half-finished product is ground along the longitudinal direction of the cores 66 with a dicing saw (DAD321 manufactured by Disco K.K. and having a blade width of 0.10 mm) so that the side portions of the optical waveguide half-finished product are removed to make the distance between each side edge of the resultant and the corresponding outermost core 100 µm. The optical waveguide half-finished product has a length (width) of 2 mm in a direction perpendicular to the longitudinal direction of the cores 66. Also, the optical waveguide half-finished product is ground so that the length thereof in the longitudinal direction of the cores 66 becomes 100 mm.

Then, as shown in FIG. 5, step portions 36a and 36b each having a square cross-section, a width of 0.1 mm, and a depth of 0.1 mm are formed in a lower portion 38A and an upper portion of one end portion of the resultant so that the longitudinal directions of the step portions 36a and 36b coincide with the direction perpendicular to the longitudinal direction of the cores 66.

The step portions 36a and 36b are used to position the optical waveguide 38 relative to an optical waveguide ferrule 70 described later and having protruding portions 46a and 46b due to the step portions 36a and 36b respectively abutting the protruding portions 46a and 46b.

Formation of Optical Waveguide Ferrule

An optical waveguide ferrule 70 is made of an epoxy resin including quartz glass powder in accordance with an injection-molding method. An opening portion 44 is formed in the optical waveguide ferrule 70 as shown in FIG. 5, and this ferrule 70 has a substantially rectangular shape when viewed from one end thereof. The opening portion 44 is used to accommodate the optical waveguide 38. Protruding portions 46a and 46b are respectively formed on an inner lower surface 44A and an inner upper surface of the ferrule so that they are disposed at an end of the ferrule in the opening portion 44. The protruding portions 46a and 46b each have a width of 0.1 mm and a height of 0.1 mm.

The optical waveguide 38 is inserted, from an end portion of the optical waveguide ferrule 70 which end portion is opposite the protruding portions, into the opening portion 44 of the optical waveguide ferrule 70, and the step portions 36a and 36b of the optical waveguide 38 respectively abut the protruding portions 46a and 46b of the optical waveguide ferrule 70, and the optical waveguide 38 is thereby positioned relative to the optical waveguide ferrule 70. An ultraviolet-curable adhesive (manufactured by JSR K.K.) is dropped into a gap between the inner surfaces of the optical waveguide ferrule 70 and the upper, side and bottom surfaces of the optical waveguide 38, and exposed to UV light of 50 mW/cm$^2$ for 5 minutes to cure this adhesive. Thereby, the optical waveguide 38 is fixed to the optical waveguide ferrule 70.

Pin holes 42 are formed in an end portion of the optical waveguide ferrule 70 which end portion abuts an optical fiber connector 41 when the ferrule is connected to the optical fiber connector 41. One end portion of a pin 45 is inserted into the pin hole 42, while the other end portion of the pin 45 is inserted into a pin hole 43 of the optical fiber connector 41. As a result, the optical waveguide ferrule 70 is positioned relative to the optical fiber connector 41 and connected thereto. At this time, the optical axes of cores 66 of the optical waveguide ferrule 70 coincide respectively with the optical axes of optical waveguides 67 of the optical fiber connector 41.

Then, the optical waveguide ferrule 70 and the optical fiber connector 41 are fixed to each other by a spring clamp (not shown).

In the optical waveguide 38 and optical waveguide ferrule 70 formed by the aforesaid method, the step portions 36a and 36b and the protruding portions 46a and 46b for positioning are provided at upper and lower end portions so that they extend in the direction perpendicular to the longitudinal direction of the cores 66. When such an optical waveguide 38 is connected to such an optical waveguide ferrule 70, the step portions 36a and 36b of the optical waveguide 38 respectively abut the protruding portions 46a and 46b of the optical waveguide ferrule 70. At this time, the end surface of the optical waveguide ferrule to be connected to the optical fiber connector hardly declines. The optical waveguide 38 is thereby positioned relative to the optical waveguide ferrule 70 in the longitudinal direction of the cores 66. Thus, merely by connecting the optical waveguide 38 to the optical waveguide ferrule 70, the end surface of the optical waveguide 38 coincides with that of the optical waveguide ferrule 70. Moreover, by connecting the resultant optical connector to the optical fiber connector, the optical axes of the cores 66 of the optical waveguide 38 respectively coincide with the optical axes of the optical waveguides 67 of the optical fiber connector 41. Accordingly, a special alignment operation is not necessary. Therefore, the connecting operation is not complicated, and costs can be reduced.

When the optical waveguide ferrule 70 is connected to the optical fiber connector 41, not only the end surfaces of the cores 66, but also the end surface of the optical waveguide ferrule 70 respectively abut the end surfaces of the optical waveguides 67 of the optical fiber connector 41 and the end surface of the optical fiber connector 41. Therefore, damage of the end surfaces of the cores 66, which is caused by a case where abutting of the cores of the optical waveguide 38 and the optical waveguides 67 does not happen together with a butting of the optical waveguide ferrule 70 and the optical fiber connector 41, does not occur, and in turn optical connection loss does not increase.

Further, since the step portions 36a and 36b are formed in the lower and upper end portions of the optical waveguide 38 beneath or above the end portions of the cores 66, the optical waveguide 38 does not require special space where a portion used to position the optical waveguide 38 relative to the optical waveguide ferrule is formed. Therefore, the width of the optical waveguide 38 does not increase. Even when the number of the cores 66 increases, the width of the optical waveguide 38 corresponds to the width of a row of cores 66 arranged in parallel. Therefore, even when the optical waveguide 38 has a substrate made of a material which does not have so high mechanical strength, such as a silicon substrate or a glass substrate, the optical waveguide 38 does not easily bend down. As a result, increase in optical connection loss due to misalignment of the optical axes can be suppressed.

Example 3

First, an optical waveguide half-finished product is formed and a step portion 36 for positioning is formed in the same manner as in Example 1.

Formation of Optical Waveguide Ferrule

Figure 6A:
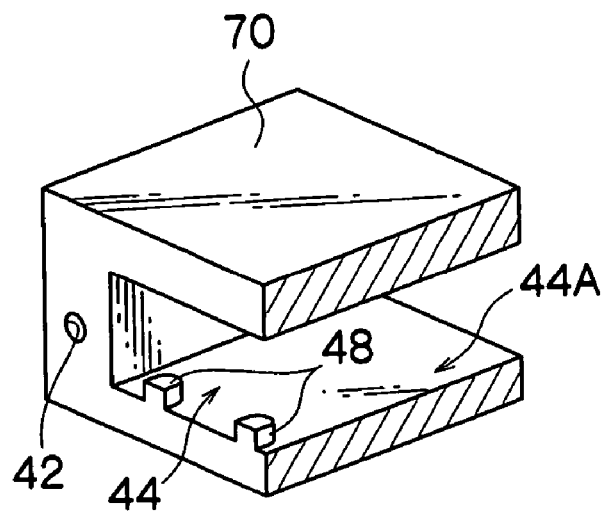
FIGS. 6A and 6B are perspective views showing other optical waveguide ferrule which perspective views have partial cross-sections.

An optical waveguide ferrule 70 is made of an epoxy resin including quartz glass powder in accordance with an injection-molding method. An opening portion 44 is formed in the optical waveguide ferrule 70 as shown in FIG. 6A, and this ferrule 70 has a substantially rectangular shape when viewed from one end thereof. The opening portion 44 is used to accommodate the optical waveguide 38. Pillar-shaped protrusions 48 are respectively formed on an inner lower surface 44A of the ferrule so that they are disposed at an end of the ferrule in the opening portion 44. The protrusions 48 each have a width of 0.1 mm, a depth of 0.1 mm and a height of 0.1 mm.

The optical waveguide 38 is inserted, from an end portion of the optical waveguide ferrule 70 which end portion is opposite the protrusions, into the opening portion 44 of the optical waveguide ferrule 70, and the step portion of the optical waveguide 38 abuts the protrusions 48 of the optical waveguide ferrule 70, and the optical waveguide 38 is thereby positioned relative to the optical waveguide ferrule 70. An ultraviolet-curable adhesive (manufactured by JSR K.K.) is dropped into a gap between the inner surfaces of the optical waveguide ferrule 70 and the upper, side and bottom surfaces of the optical waveguide 38, and exposed to UV light of 50 mW/cm$^2$ for 5 minutes to cure this adhesive. Thereby, the optical waveguide 38 is fixed to the optical waveguide ferrule 70.

Pin holes 42 are formed in an end portion of the optical waveguide ferrule 70 which end portion abuts an optical fiber connector 41 when the ferrule is connected to the optical fiber connector 41. One end portion of a pin 45 is inserted into the pin hole 42, while the other end portion of the pin 45 is inserted into a pin hole 43 of the optical fiber connector 41. As a result, the optical waveguide ferrule 70 is positioned relative to the optical fiber connector 41 and connected thereto. At this time, the optical axes of cores 66 of the optical waveguide ferrule 70 coincide respectively with the optical axes of optical waveguides 67 of the optical fiber connector 41.

Then, the optical waveguide ferrule 70 and the optical fiber connector 41 are fixed to each other by a spring clamp (not shown).

In the optical waveguide 38 and optical waveguide ferrule 70 formed in accordance with the aforesaid method, the step portion 36 and the pillar-shaped protrusions 48 for positioning are provided so that they extend in the direction perpendicular to the longitudinal direction of the cores 66. When such an optical waveguide 38 is connected to such an optical waveguide ferrule 70, the step portion 36 of the optical waveguide 38 abuts the protrusions 48 of the optical waveguide ferrule 70, and the optical waveguide 38 is thereby positioned relative to the optical waveguide ferrule 70 in the longitudinal direction of the cores 66. Thus, merely by connecting the optical waveguide 38 to the optical waveguide ferrule 70, the end surface of the optical waveguide 38 coincides with that of the optical waveguide ferrule 70. Moreover, by connecting the resultant optical connector to the optical fiber connector, the optical axes of the cores 66 of the optical waveguide 38 respectively coincide with the optical axes of the optical waveguides 67 of the optical fiber connector 41. Accordingly, a special alignment operation is not necessary. Therefore, the connecting operation is not complicated, and costs can be reduced.

When the optical waveguide ferrule 70 is connected to the optical fiber connector 41, not only the end surfaces of the cores 66, but also the end surface of the optical waveguide ferrule 70 respectively abut the end surfaces of the optical waveguides 67 of the optical fiber connector 41 and the end surface of the optical fiber connector 41. Therefore, damage of the end surfaces of the cores 66, which is caused by a case where abutting of the cores of the optical waveguide 38 and the optical waveguides 67 does not happen together with abutting of the optical waveguide ferrule 70 and the optical fiber connector 41, does not occur, and in turn optical connection loss does not increase.

Further, since the step portion 36 is formed in the lower end portion of the optical waveguide 38 which lower portion is beneath the end portions of the cores 66, the optical waveguide 38 does not require special space where a portion used to position the optical waveguide 38 relative to the optical waveguide ferrule is formed. Therefore, the width of the optical waveguide 38 does not increase. Even when the number of the cores 66 increases, the width of the optical waveguide 38 corresponds to the width of a row of cores 66 arranged in parallel. Therefore, even when the optical waveguide 38 has a substrate made of a material which does not have so high mechanical strength, such as a silicon substrate or a glass substrate, the optical waveguide 38 does not easily bend down. As a result, increase in optical connection loss due to misalignment of the optical axes can be suppressed.

Example 4

First, an optical waveguide half-finished product is formed in the same manner as in Example 1, and step portions for positioning are formed in the same manner as in Example 2.

Formation of Optical Waveguide Ferrule

Figure 6B:
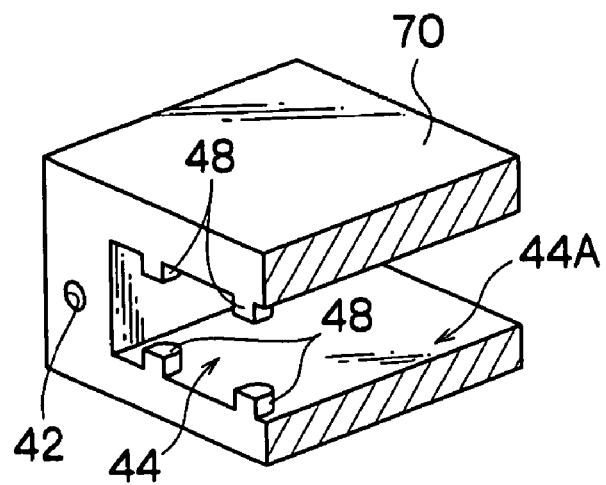

An optical waveguide ferrule 70 is made of an epoxy resin including quartz glass powder in accordance with an injection-molding method. An opening portion 44 is formed in the optical waveguide ferrule 70 as shown in FIG. 6B, and this ferrule 70 has a substantially rectangular shape when viewed from one end thereof. The opening portion 44 is used to accommodate the optical waveguide 38. Pillar-shaped protrusions 48 are respectively formed on an inner lower surface 44A and an inner upper surface of the ferrule so that they are disposed at an end of the ferrule in the opening portion 44. The protrusions 48 each have a width of 0.1 mm, a depth of 0.1 mm and a height of 0.1 mm.

The optical waveguide 38 is inserted, from an end portion of the optical waveguide ferrule 70 which end portion is opposite the protrusions, into the opening portion 44 of the optical waveguide ferrule 70, and the step portions 36a and 36b of the optical waveguide 38 respectively abut the protrusions 48 of the optical waveguide ferrule 70, and the optical waveguide 38 is thereby positioned relative to the optical waveguide ferrule 70. An ultraviolet-curable adhesive (manufactured by JSR K.K.) is dropped into a gap between the inner surfaces of the optical waveguide ferrule 70 and the upper, side and bottom surfaces of the optical waveguide 38, and exposed to UV light of 50 mW/cm$^2$ for 5 minutes to cure this adhesive. Thereby, the optical waveguide 38 is fixed to the optical waveguide ferrule 70.

Pin holes 42 are formed in an end portion of the optical waveguide ferrule 70 which end portion abuts an optical fiber connector 41 when the ferrule is connected to the optical fiber connector 41. One end portion of a pin 45 is inserted into the pin hole 42, while the other end portion of the pin 45 is inserted into a pin hole 43 of the optical fiber connector 41. As a result, the optical waveguide ferrule 70 is positioned relative to the optical fiber connector 41 and connected thereto. At this time, the optical axes of cores 66 of the optical waveguide ferrule 70 coincide respectively with the optical axes of optical waveguides 67 of the optical fiber connector 41.

Then, the optical waveguide ferrule 70 and the optical fiber connector 41 are fixed to each other by a spring clamp (not shown).

In the optical waveguide 38 and optical waveguide ferrule 70 formed in accordance with the aforesaid method, the step portions 36a and 36b and the pillar-shaped protrusions 48 for positioning are provided in the lower and upper end portions so that they extend in the direction perpendicular to the longitudinal direction of the cores 66. When such an optical waveguide 38 is connected to such an optical waveguide ferrule 70, the step portions 36a and 36b of the optical waveguide 38 abut the protrusions 48 of the optical waveguide ferrule 70. At this time, the end surface of the optical waveguide ferrule to be connected to the optical fiber connector hardly declines. The optical waveguide 38 is thereby positioned relative to the optical waveguide ferrule 70 in the longitudinal direction of the cores 66. Thus, merely by connecting the optical waveguide 38 to the optical waveguide ferrule 70, the end surface of the optical waveguide 38 coincides with that of the optical waveguide ferrule 70. Moreover, by connecting the resultant optical connector to the optical fiber connector, the optical axes of the cores 66 of the optical waveguide 38 respectively coincide with the optical axes of the optical waveguides 67 of the optical fiber connector 41. Accordingly, a special alignment operation is not necessary. Therefore, the connecting operation is not complicated, and costs can be reduced.

When the optical waveguide ferrule 70 is connected to the optical fiber connector 41, not only the end surfaces of the cores 66, but also the end surface of the optical waveguide ferrule 70 respectively abut the end surfaces of the optical waveguides 67 of the optical fiber connector 41 and the end surface of the optical fiber connector 41. Therefore, damage of the end surfaces of the cores 66, which is caused by a case where abutting of the cores of the optical waveguide 38 and the optical waveguides 67 does not happen together with abutting of the optical waveguide ferrule 70 and the optical fiber connector 41, does not occur, and in turn optical connection loss does not increase.

Further, since the step portions 36a and 36b are formed in the lower and upper end portions of the optical waveguide 38 beneath or above the end portions of the cores 66, the optical waveguide 38 does not require special space where a portion used to position the optical waveguide 38 relative to the optical waveguide ferrule is formed. Therefore, the width of the optical waveguide 38 does not increase. Even when the number of the cores 66 increases, the width of the optical waveguide 38 corresponds to the width of a row of cores 66 arranged in parallel. Therefore, even when the optical waveguide 38 has a substrate made of a material which does not have so high mechanical strength, such as a silicon substrate or a glass substrate, the optical waveguide 38 does not easily bend down. As a result, increase in optical connection loss due to misalignment of the optical axes can be suppressed.

What is claimed is:

1. An optical waveguide comprising:
    an optical waveguide core for transmitting optical signals;
    a plate-shaped clad portion containing the optical waveguide core therein; and
    at least one of a concave portion and a convex portion formed to receive a pillar-shaped portion formed in an opening portion of an optical waveguide ferrule, the at least one of a concave portion and a convex portion being at an end surface portion of the clad portion which end surface portion is disposed at an exposing end of the optical waveguide core.

2. An optical waveguide according to claim 1, wherein the clad portion is provided with a concave portion.

3. An optical waveguide according to claim 1, wherein at least one of the optical waveguide core and the clad portion is made of a polymer compound.

4. An optical waveguide according to claim 1, wherein the at least one of the concave portion and the convex portion extends in a direction perpendicular to the longitudinal direction of the optical waveguide core.

5. An optical waveguide according to claim 2, wherein the concave portion has a rectangular parallelopiped shape.

6. An optical waveguide according to claim 5, wherein the concave portion extends in a direction perpendicular to the longitudinal direction of the optical waveguide core.

7. An optical waveguide ferrule comprising:
an opening portion for receiving an optical waveguide having an optical waveguide core; and
a convex portion on an inner surface thereof at one end of the opening portion where the optical waveguide core is exposed, wherein
the convex portion has a pillar-like shape and is formed at an end of the opening portion from an insertion direction, and a front end surface of the optical waveguide becomes flush with a front end surface of the optical waveguide ferrule when the optical waveguide has been fit in position in the optical waveguide ferrule.

8. An optical waveguide ferrule according to claim 7, wherein the convex portion extends in a direction perpendicular to a direction along which an optical waveguide is to be inserted into the opening portion.

9. An optical waveguide ferrule according to claim 7, comprising two convex portions having a pillar-like shape.

10. An optical connector comprising:
an optical waveguide including an optical waveguide core for transmitting optical signals, a plate-shaped clad portion containing the optical waveguide core therein, and at least one of a concave portion and a convex portion at an end surface portion of the clad portion which end surface portion is disposed at an exposing end of the optical waveguide core; and
an optical waveguide ferrule comprising an opening portion for receiving the optical waveguide, and, when the optical waveguide has a concave portion, comprising a convex portion and, when the optical waveguide has a convex portion, comprising a convex portion having a concave portion, on an inner surface thereof at one end of the opening portion from an insertion direction where the optical waveguide core is exposed;
wherein the optical waveguide is inserted in the opening portion of the optical waveguide ferrule, and the at least one of the concave portion and the convex portion of the optical waveguide is engaged with at least one of the convex portion and the concave portion of the convex portion of the optical waveguide ferrule, and
the convex portion of the ferrule has a pillar-like shape.

11. An optical connector according to claim 10, wherein the optical waveguide has a concave portion, and the optical waveguide ferrule has a convex portion.

12. An optical connector according to claim 10, wherein at least one of the optical waveguide core and the clad portion is made of a polymer compound.

13. An optical connector according to claim 10, wherein the at least one of the concave portion and the convex portion of the optical waveguide extends in a direction perpendicular to the longitudinal direction of the optical waveguide core.

14. An optical connector according to claim 11, wherein the concave portion of the optical waveguide has a rectangular parallelopiped shape.

15. An optical connector according to claim 14, wherein the concave portion of the optical waveguide extends in a direction perpendicular to the longitudinal direction of the optical waveguide core.

16. An optical connector according to claim 11, wherein the convex portion of the optical waveguide ferrule extends in a direction perpendicular to a direction along which the optical waveguide is inserted into the opening portion.

17. An optical connector according to claim 11, wherein the optical waveguide ferrule comprises two convex portionshaving a pillar-like shape.

* * * * *